United States Patent
Arienti et al.

(10) Patent No.: US 10,632,979 B2
(45) Date of Patent: Apr. 28, 2020

(54) AUTOMATICALLY CONTROLLED BRAKING SYSTEM FOR VEHICLES AND METHOD OF ACTUATING AND CONTROLLING A BRAKING SYSTEM FOR VEHICLES

(71) Applicant: FRENI BREMBO S.p.A., Curno, Bergamo (IT)

(72) Inventors: Roberto Arienti, Bergamo (IT); Carlo Cantoni, Bergamo (IT); Andrea Odoni, Bergamo (IT)

(73) Assignee: FRENI BREMBO S.p.A., Curno, Bergamo (IT)

( * ) Notice: Subject to any disclaimer, the term of this patent is extended or adjusted under 35 U.S.C. 154(b) by 0 days.

(21) Appl. No.: 15/322,695

(22) PCT Filed: Jun. 26, 2015

(86) PCT No.: PCT/IB2015/054825
§ 371 (c)(1),
(2) Date: Dec. 28, 2016

(87) PCT Pub. No.: WO2016/001809
PCT Pub. Date: Jan. 7, 2016

(65) Prior Publication Data
US 2017/0137009 A1 May 18, 2017

(30) Foreign Application Priority Data

Jun. 30, 2014 (IT) .............................. BG2014A0023

(51) Int. Cl.
*B60T 13/18* (2006.01)
*B60T 8/40* (2006.01)
(Continued)

(52) U.S. Cl.
CPC ............ *B60T 13/18* (2013.01); *B60T 8/4081* (2013.01); *B60T 11/10* (2013.01); *B60T 13/168* (2013.01);
(Continued)

(58) Field of Classification Search
CPC .......... B60T 7/042; B60T 8/368; B60T 8/441; B60T 8/4013; B60T 8/4031;
(Continued)

(56) References Cited

U.S. PATENT DOCUMENTS 5,197,788 A * 3/1993 Fennel ................ B60T 8/17616
188/181 A
5,971,500 A * 10/1999 Voges ..................... B60T 7/042
303/113.4
(Continued)

FOREIGN PATENT DOCUMENTS

CN 102470841 A 5/2012
DE 10 2012 214 586 A1 5/2013
(Continued)

OTHER PUBLICATIONS

International Search Report and Written Opinion of the International Searching Authority for corresponding International Patent Application No. PCT/IB2015/054825 dated Oct. 29, 2015, 9 pgs.
(Continued)

*Primary Examiner* — Robert A. Siconolfi
*Assistant Examiner* — San M Aung
(74) *Attorney, Agent, or Firm* — Merchant & Gould P.C.

(57) ABSTRACT

A braking system for vehicles includes a hydraulic actuator unit operatively connected to at least one braking device, so as to control its actuation by a first hydraulic circuit at a first working pressure. The hydraulic actuator unit includes at least one manual actuator for a user to allow the user to supply the braking system with a braking request. A power
(Continued)

generation unit is operatively connected to the hydraulic actuator unit by a second hydraulic circuit at a second working pressure. An actuated brake pump is connected in input to the second hydraulic circuit of the power generation unit to be actuated, and operatively connected, in output, to the first hydraulic circuit for actuation of the at least one braking device. The first and the second hydraulic circuits are supplied with different hydraulic fluids fluidically separate from each other.

13 Claims, 4 Drawing Sheets

(51) Int. Cl.
B60T 13/68 (2006.01)
B60T 11/10 (2006.01)
B60T 13/16 (2006.01)

(52) U.S. Cl.
CPC ....... *B60T 13/686* (2013.01); *B60T 2270/404* (2013.01); *B60T 2270/82* (2013.01); *B60Y 2200/114* (2013.01)

(58) Field of Classification Search
CPC .... B60T 8/4072; B60T 8/4081; B60T 8/4045; B60T 8/4059; B60T 8/445; B60T 8/17616
USPC ...................... 303/10, 115.1, 119.1
See application file for complete search history.

(56) References Cited

U.S. PATENT DOCUMENTS

| | | | |
|---|---|---|---|
| 2002/0140285 A1* | 10/2002 | Baumgartner | B60T 8/4081 303/119.1 |
| 2006/0091726 A1* | 5/2006 | Hatano | B60T 8/267 303/122.13 |
| 2012/0137673 A1* | 6/2012 | Drumm | B60T 8/4077 60/545 |
| 2013/0147259 A1* | 6/2013 | Linkenbach | B60T 7/042 303/14 |
| 2014/0174072 A1* | 6/2014 | Ishizuka | B60T 7/042 60/545 |
| 2014/0225425 A1* | 8/2014 | Drumm | B60T 7/042 303/9.75 |

FOREIGN PATENT DOCUMENTS

| | | |
|---|---|---|
| EP | 1 004 492 A2 | 5/2000 |
| EP | 2 711 257 A1 | 3/2014 |
| JP | H08-175347 A | 7/1996 |
| JP | 2012-116343 A | 6/2012 |

OTHER PUBLICATIONS

Chinese Search Report for corresponding Chinese Patent Application No. 2015800353203 dated Aug. 23, 2018, 2 pages.
Japanese Office Action for corresponding Japanese Patent Application No. 2016-575807 dated Mar. 12, 2019, 2 pages.

* cited by examiner

AUTOMATICALLY CONTROLLED BRAKING SYSTEM FOR VEHICLES AND METHOD OF ACTUATING AND CONTROLLING A BRAKING SYSTEM FOR VEHICLES

This application is a National Stage Application of PCT/IB2015/054825, filed 26 Jun. 2015, which claims benefit of Serial No. BG2014A000023, filed 30 Jun. 2014 in Italy and which applications are incorporated herein by reference. To the extent appropriate, a claim of priority is made to each of the above disclosed applications.

FIELD OF APPLICATION

This invention regards an automatically controlled braking system for vehicles and a method of actuating and controlling a braking system for vehicles.

STATE OF THE ART

In particular, the diffusion of kinetic energy recovery systems (KERS), increasingly powerful on racing cars, has necessitated the diffusion of systems able to automatically "mix" regenerative and dissipative braking. Regenerative braking is precisely the one that allows the recovery of energy during braking by converting the kinetic energy lost by the vehicle into electricity energy to be recovered and/or stored; dissipative braking is, instead, that "traditional" one that consists in converting/dissipating the kinetic energy of the vehicle as thermal energy, i.e., the heating of the brakes, which are typically disc brake callipers, pads and brake discs.

These systems actuate the traditional (or dissipative) braking system by means of "Brake By Wire" actuators: in other words, the user does not directly control the braking devices by directly operating a lever or pedal that puts pressure on the system fluidically connected to such braking devices, but the braking requested by the user, exerted by the actuation of a lever or pedal, is read and converted into the corresponding actuation of the braking devices by the related actuators.

The reduced actuation times (0.1-0.2 s to reach maximum pressure in the braking system) mean that these actuators require a high instantaneous power but also a low average power on the lap (when it comes to racing cars).

Moreover, being in a competition environment, the mass of the actuator also plays a crucial role and must be as low as possible.

SUMMARY OF THE INVENTION

In the known solutions, therefore, always in the field of racing cars, the need for high instantaneous powers and low power supply voltages, leads to electrical components of large size and mass, not very suitable for racing applications.

This, therefore, reveals a glaring technical contradiction: to have the performance required, the components are too massive, while, with acceptable masses, the components are able to provide the required actuation powers.

Therefore, there is a need to solve the drawbacks and limitations mentioned in reference to the known art, namely there is a need to provide a braking system that ensures high power, reduced actuation times and, at the same time, components having small masses so as not to affect the performance of the vehicles on which such systems are installed.

In particular, this need is met by a braking system for vehicles comprising
a hydraulic actuator unit operatively connected to at least one braking device, so as to control its actuation by means of a first hydraulic circuit at a first working pressure, wherein the hydraulic actuator unit comprises at least one manual actuator for a user, to allow the user to supply the braking system with a braking request,
a power generation unit, operatively connected to the hydraulic actuator unit by means of a second hydraulic circuit at a second working pressure,
an actuated brake pump, operatively connected, in input, to the second hydraulic circuit of the power generation unit to be actuated, and operatively connected, in output, to the first hydraulic circuit for the actuation of the at least one braking device,
wherein the first and the second hydraulic circuits are supplied with different hydraulic fluids fluidically separate from each other,
providing at least one control unit of the system that supervises the operation of the system.

According to a possible embodiment, the system comprises a control valve interacting with the manual actuator and with the output of the actuated brake pump, said control valve being operable in at least a first operating condition or standard condition, in which the control valve fluidically connects an outlet of the actuated brake pump with the at least one braking device and fluidically disconnects an outlet branch of the manual actuator from the at least one braking device.

According to a possible embodiment, the hydraulic actuator unit comprises a hydraulic tank or accumulator that, in the first operating condition, receives and stores the fluid received from an outlet branch of the manual actuator.

According to a possible embodiment, the control valve, in the first operating condition, fluidically connects said hydraulic accumulator or tank to the outlet branch of the manual actuator.

According to a possible embodiment, the control unit is programmed so as to actuate the control valve in the first operating condition if the second working pressure in the second hydraulic circuit is maintained greater than or equal to a threshold value.

According to a possible embodiment, said control valve is operable in a second operating condition or safety condition, in which the control valve fluidically disconnects the outlet of the actuated brake pump from the at least one braking device and fluidically connects the outlet of the manual, actuator to the at 'least one' braking device.

According to a possible embodiment, the hydraulic actuator unit comprises a hydraulic tank or accumulator that, in the second operating condition, receives and stores the fluid received from an outlet of the actuated brake pump.

According to a possible embodiment, the control valve, in the second operating condition, fluidically connects said tank to the outlet of the actuated brake pump.

According to a possible embodiment, the control unit is programmed so as to actuate the control valve in the second operating condition if the pressure inside the second hydraulic circuit falls below a threshold value.

According to a possible embodiment, the control valve is actuated by the control unit of the system by means of the second hydraulic circuit.

According to a possible embodiment, the control valve is provided with elastic pre-loading means that push the control valve to function in the second operating or safety condition.

According to a possible embodiment, the actuated brake pump comprises a dual effect actuating cylinder, subjected at opposite chambers to the action of different pressures regulated by a servo-valve that acts in the second hydraulic circuit.

According to a possible embodiment, the power generation unit comprises an auxiliary circuit of the vehicle for the control of the auxiliary devices of the vehicle.

According to a possible embodiment, the power generation unit comprises at least one motor operatively connected to a pump for pressurizing the second hydraulic fluid to the second working pressure.

According to a possible embodiment, the power generation unit is operatively connected to the control unit of the system so as to be controlled by the latter.

According to a possible embodiment, the actuated brake pump is operatively connected, in output, to at least two braking devices arranged on the same axle of a vehicle (in case of a 4-wheel vehicle) or to a single braking device (in the case of a 2-wheel vehicle).

According to a possible embodiment it is possible to provide for the mounting on the vehicle of two actuation units so as to independently control braking on different axles, without the need to use a splitter.

The technical problem of this invention is also solved by a method of actuating and controlling a braking system for vehicles comprising the steps of:
  providing a hydraulic actuator unit operatively connected to at least one braking device, so as to control its actuation by means of a first hydraulic circuit at a first working pressure, wherein the hydraulic actuator unit comprises at least one manual actuator for a user, to allow the user to supply the braking system with a braking request,
  providing a power generation unit, operatively connected to the hydraulic actuator unit by means of a second hydraulic circuit at a second working pressure,
  providing an actuated brake pump, operatively connected, in input, to the second hydraulic circuit of the power generation unit to be actuated, and operatively connected, in output, to the first hydraulic circuit for the actuation of the at least one braking device,
  supplying the first and the second hydraulic circuits with different hydraulic fluids fluidically separate from each other,
  providing at least one control unit of the system that supervises the operation of the system.

According to one embodiment, said method for actuating and controlling comprises the step of providing a braking system for vehicles according to any one of the embodiment variants listed above.

DESCRIPTION OF THE DRAWINGS

Further characteristics and advantages of this invention will be more understandable from the following description of its preferred and non-limiting examples of embodiments, wherein.

The elements, or parts of elements, in common between the embodiments described below will be indicated with the same reference numbers.

DETAILED DESCRIPTION

Figure 1:
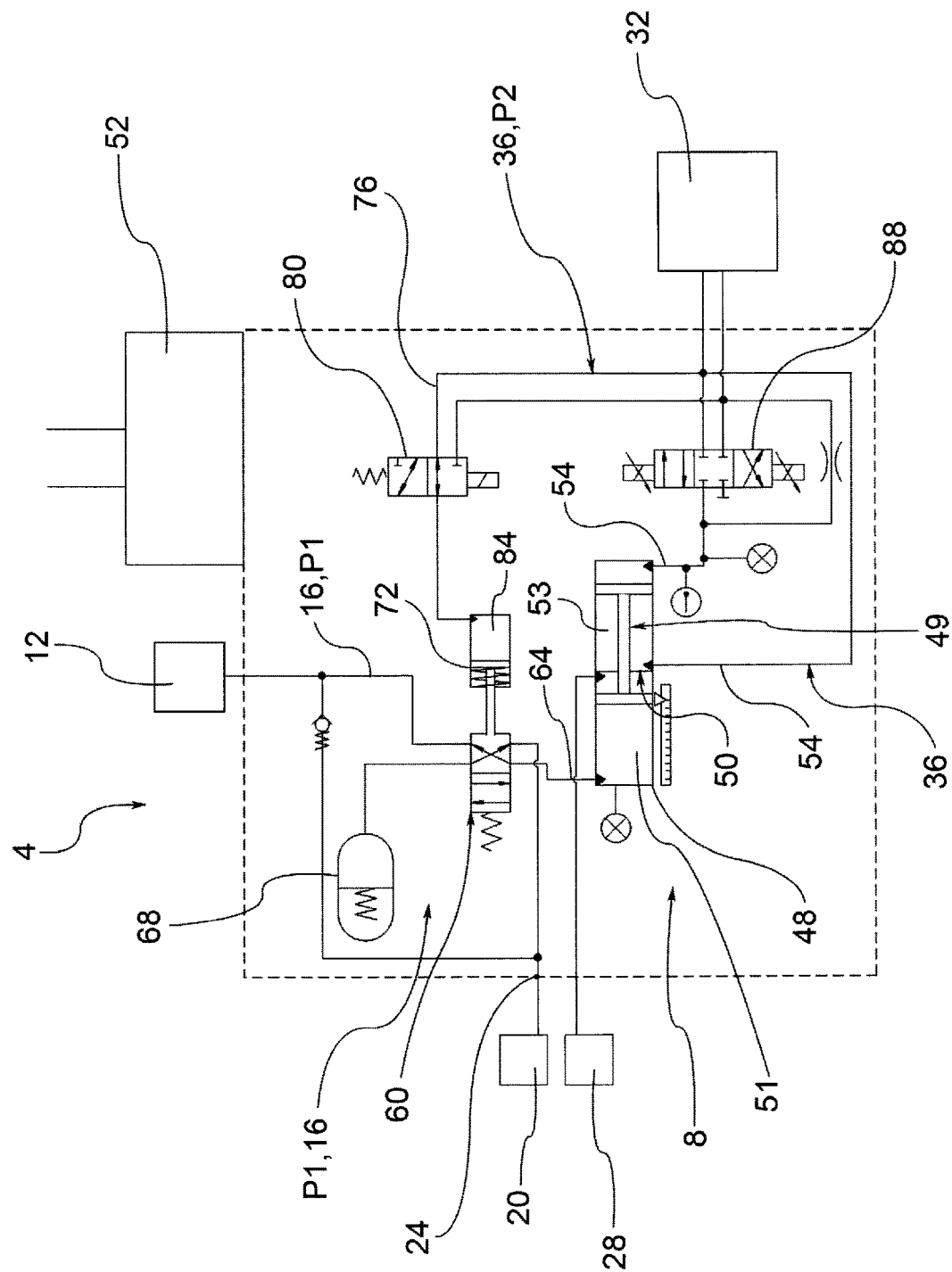
FIG. 1 is a schematic view of a braking system according to the invention, in a first operating condition.
Figure 2:
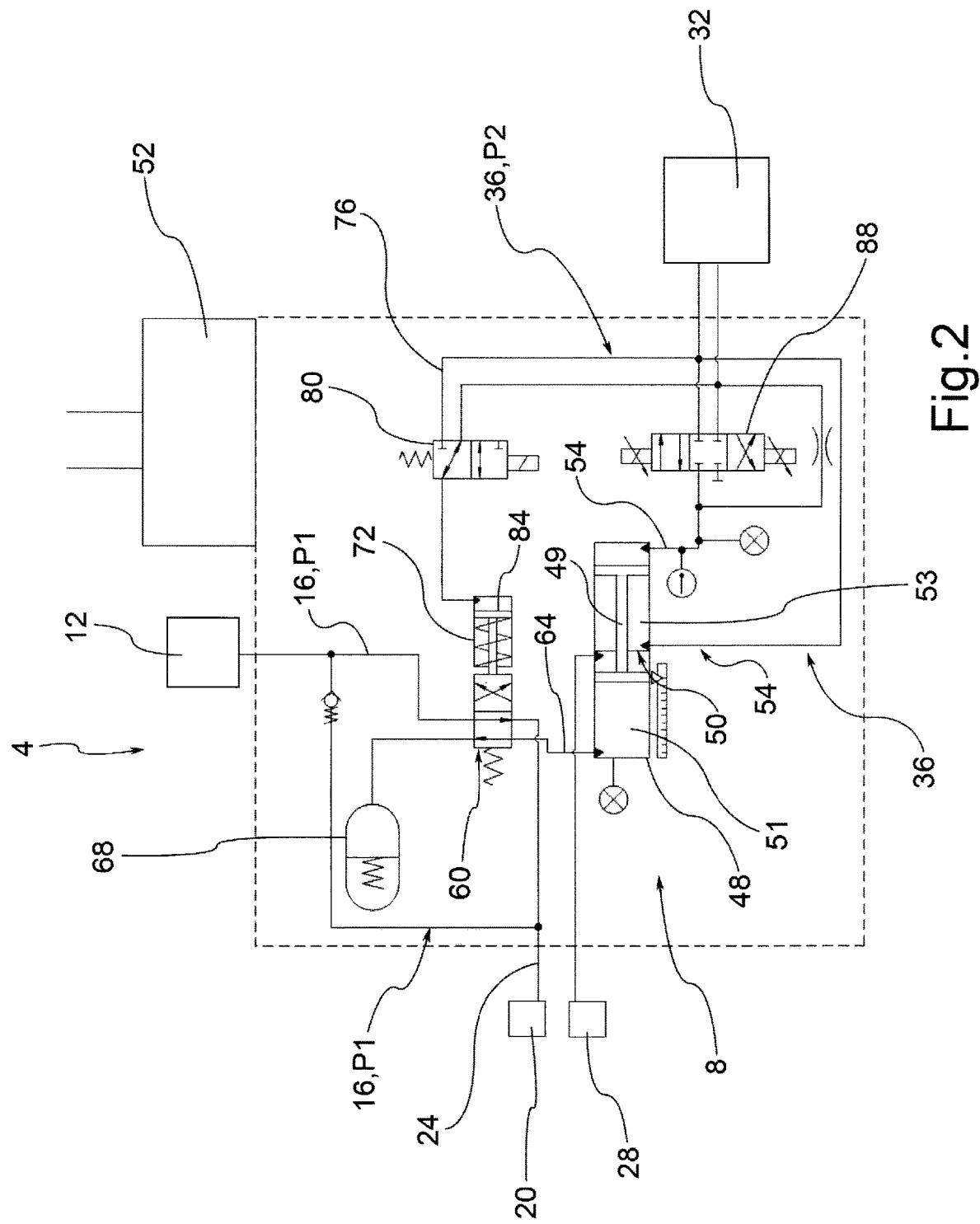
FIG. 2 is a schematic view of the braking system of FIG. 1, in a second operating condition.
Figure 3:
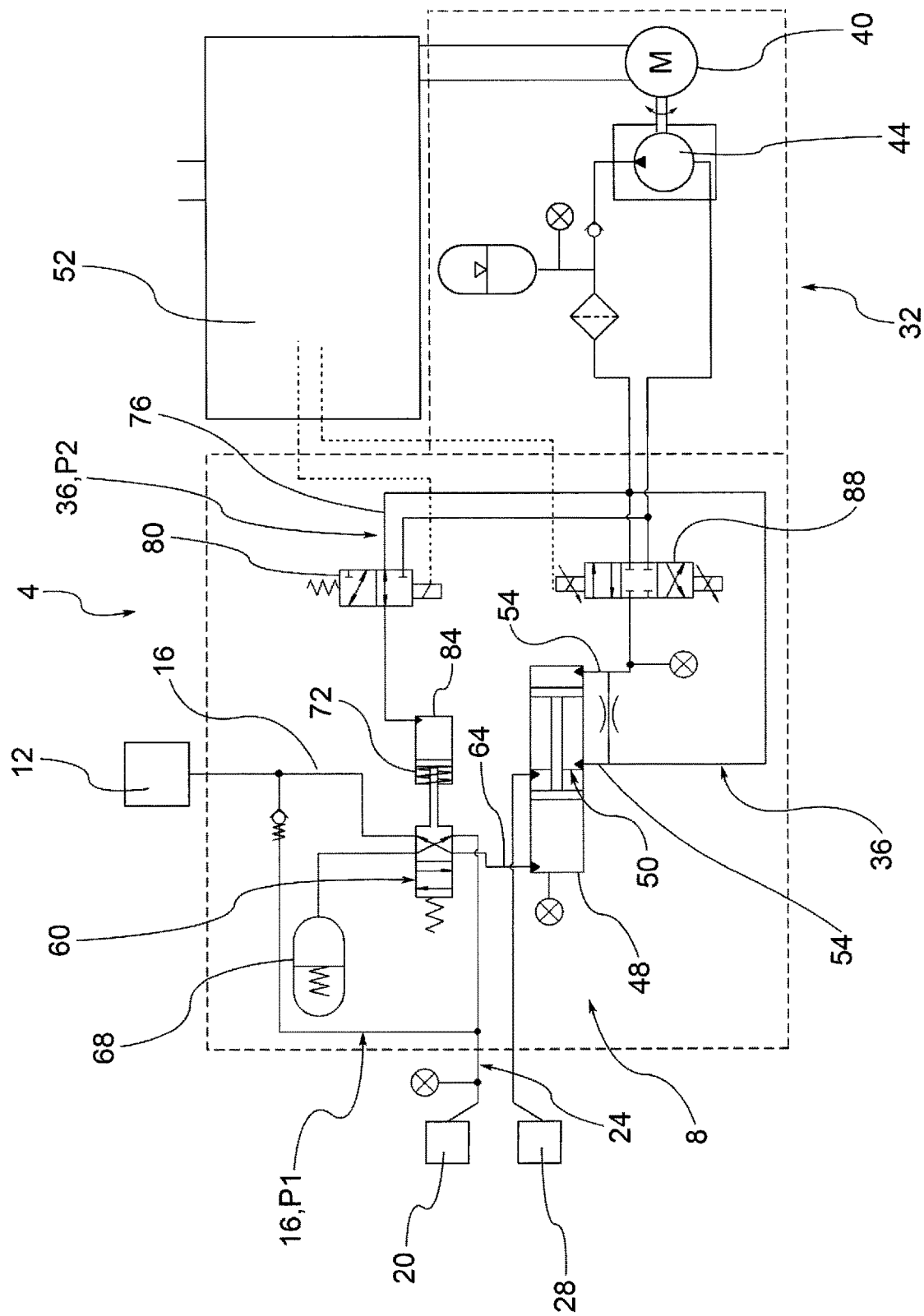
FIG. 3 is a schematic view of a braking system according to a further embodiment of this invention.

With reference to the above figures, the reference number 4 globally indicates a braking system for vehicles.

First, for the purposes of this invention, it is necessary to specify that, by vehicles is meant, in general, motor vehicles, of any type, size and power, with two, three, four or more wheels, as well as two or more related axles; it is then obvious that this invention preferably, although not exclusively, refers to high-performance four-wheel vehicles, as explained in the introductory part.

The braking system comprises a hydraulic actuation unit 8 operatively connected to at least one braking device 12, so as to control it in actuation through a first hydraulic circuit 16 at a first working pressure P1.

For the purposes of this invention, the type of braking device 12 used is irrelevant since it can be, preferably but not exclusively, a calliper for a fixed or floating type disc brake in a single piece or two half-callipers connected to each other and so on.

The hydraulic actuation unit 8 comprises at least one manual actuator 20 for a user so as to allow the user to provide the braking system a braking request.

The manual actuator 20 may comprise, for example, an operating lever or pedal that actuates a hydraulic pump that pressurizes the brake fluid.

The manual actuator 20 is in turn equipped with its own hydraulic circuit comprising an output branch 24 and a brake fluid tank 28 to supply brake fluid to the circuit following the consumption of the friction material of the brake pads. The hydraulic circuit of the manual actuator 20 interacts with the first hydraulic circuit 16, as better described below.

The braking system 4 also comprises a power generation unit 32, operatively connected to the hydraulic actuator unit 8 by means of a second hydraulic circuit 36 at a second working pressure P2. According to an embodiment of this invention, the power generation unit 32 comprises an auxiliary circuit of the vehicle for the control of the auxiliary devices of the vehicle. Such auxiliary devices can include both vehicle accessories such as, for example, an actuation system of the distribution of the propulsion unit, power supply systems of the propulsion unit and the like.

For example, in certain categories of "top racing" vehicles (e.g., F1), the cars are equipped with a high-pressure hydraulic system that can be exploited, as the power generation unit, for the actuation of the braking devices.

In other categories, for design or regulatory choices, a high-pressure hydraulic system is not present on the vehicle and actuation can be performed using electrical and, in particular, electro-hydraulic systems.

For example, according to a possible embodiment, the power generation unit 32 comprises at least one motor 40 operatively connected to a pump 44 for pressurizing the hydraulic fluid to the second working pressure P2. The motor 40 may also be replaced by a power take-off operatively connected, for example, to a drive shaft or auxiliary shaft of the propulsion unit of the associable vehicle on which the braking system 4 is mounted.

Preferably, said power generation unit 32 is electro-hydraulic, in which the motor 40 is an electric motor.

The braking system 4 also comprises an actuated brake pump 48, operatively connected, in input 54, to the second hydraulic circuit 36 of the power generation unit 32 to be actuated, and operatively connected, in output, to the first hydraulic circuit 16 for the actuation of the at least one braking device 12.

The first and the second hydraulic circuits 16,36 are supplied with different hydraulic fluids fluidically separate from each other.

For example, the hydraulic fluid of the first hydraulic circuit 16 is a typical brake fluid known in the art having, preferably, characteristics for use in high-performance systems; this brake fluid is of the synthetic type, characterized by high hygroscopicity and high resistance to bubble formation to prevent fading phenomena. Such fluid ensures high reliability in the actuation of the braking devices 12.

The hydraulic fluid of the second hydraulic circuit 36 is preferably a mineral fluid particularly suitable to working at much higher pressures, on the order of several hundreds of bar.

As seen, the first and the second hydraulic circuits 16,36 are supplied with different hydraulic fluids fluidically separate from each other: in other words, the two hydraulic fluids, being of different types and working with working pressures P1 and P2 extremely different from each other, never mix and are never in direct contact with each other; the related first and second hydraulic circuit 16,36 receive these hydraulic fluids that interact with each other by means of said actuated brake pump 48.

For example, the actuated brake pump 48 comprises a dual effect actuating cylinder 49, equipped, for example, with a first separation baffle 50 subjected, in correspondence of opposite chambers, for example a first and a second chamber 51,53, to the pressure action of the first and second hydraulic circuit 16,36. For example, the first chamber 51 is fluidically connected to the first hydraulic circuit 16 and the second chamber 53 is fluidically connected to the second hydraulic circuit 36; the dual effect actuating cylinder 49 moves in function of the forces acting from the side of each chamber 51,53.

The braking system 4 also comprises at least one control unit of the system 52 that supervises the operation of the system.

The power generation unit 32 is operatively connected to the control unit of the system 52 so as to be controlled by the latter.

Figure 4:
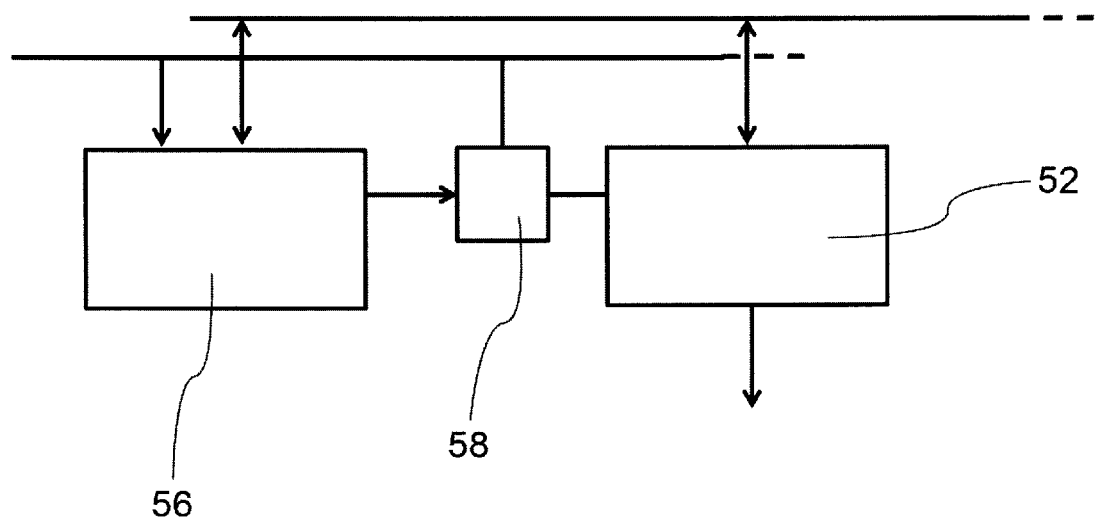
FIG. 4 is a schematic view of a connection and interaction scheme of a braking system according to this invention with an on-board system of an associable vehicle.

Moreover, it is possible to provide that the control unit of the system 52 can be connected to a corresponding control unit of the vehicle 56 (FIG. 4); in this way, under normal operating conditions, control unit of the vehicle 56 communicates instant by instant to the control unit of the system 52 which pressure it must implement.

If, instead, the control unit of the vehicle 56 detects a malfunction of the control unit of the system 52, it is able to by-pass the latter by operating the braking system in a conventional manner, namely through direct control of the user, by means of the manual actuator 20, without, therefore, actuation by the actuated brake pump 48. For example, between the control unit of the vehicle 56 and the control unit of the system 52, there is interposed a switch/relay 58 with which the control unit of the vehicle 56, which acts as "master", can bypass and/or off at least momentarily switch off the control unit of the system 52, which acts as "slave".

The braking system 4 comprises a control valve 60 that interacts with the manual actuator 20 and with an outlet or output 64 of the actuated brake pump 48.

Said control valve 60 is operable in at least a first operating condition or safety condition, in which the control valve 60 fluidically connects the outlet or output 64 of the actuated brake pump 48 to the at least one braking device 12 and fluidically disconnects an outlet branch 24 of the manual actuator 20 from the at least one braking device 12.

According to an embodiment, the hydraulic actuator unit 8 comprises a hydraulic tank or accumulator 68 that, in the first operating condition, receives and stores the fluid received from the outlet branch 24 of the manual actuator 20.

In this condition, the tank or accumulator 68 has the function of allowing a specific actuating stroke of the manual actuator operated by the user and to return to the latter a sensation of gradually increasing resistance so as to allow him to modulate the desired braking. At the same time, the control unit of the system 52 reads the braking request from the user and converts it into actuation of the braking devices 12 by means of said actuated brake pump 48, which is connected to the braking device 12 through the control valve 60.

In particular, the control valve 60, in the first operating condition, simultaneously, on the one hand, connects the actuated brake pump 48 to the braking device 12, and on the other, fluidically connects said hydraulic tank or accumulator 68 with the outlet branch 24 of the manual actuator 20.

The control valve 60 is, for example, a 4-way valve.

Preferably, the control unit of the system 52 is programmed to actuate the control valve 60 in the first operating condition if the second working pressure P2 in the second hydraulic circuit 36 is kept above or equal to a threshold value.

In other words, the control unit of the system 52 is programmed to operate the system always in the first mode, i.e., in the "by-wire" mode, in which the user makes a request for braking torque by acting on the manual actuator 20 but, in fact, never directly controls the braking devices 12, which are always actuated by the actuated brake pump 48, obviously depending on the request made manually by the user.

This first operating or functioning condition is always maintained as long as, for safety reasons, the pressure P2 in the second hydraulic circuit 36 is maintained above a predefined threshold value. In the case in which this threshold value is no longer ensured and, therefore, the system is no longer able to ensure the correct and fast actuation of the braking devices 12 by the actuated brake pump, the system, for safety reasons, passes to the second operating condition.

In particular, the control valve 60 is operable in a second operating condition or safety condition, in which the control valve 60 fluidically disconnects the outlet 64 of the actuated brake pump 48 from the at least one braking device 12 and fluidically connects the outlet branch 24 of the manual actuator 20 to the at least one braking device 12.

In this way, the user has direct control of the actuation of the braking devices 12 by means of the manual actuator 20.

Furthermore, in the second operating condition, said hydraulic tank or accumulator 68 of hydraulic actuation unit 8 receives and stores the fluid received from the outlet 64 of the actuated brake pump 48.

In particular, the control valve 60, in the second operating condition, fluidically connects said tank or accumulator 68 to the outlet 64 of the actuated brake pump 48.

The control unit of the system 52 is programmed so as to actuate the control valve 60 in the second operating condition if the pressure P2 inside the second hydraulic circuit 36 falls below a threshold value, it detects a malfunction or if the driver decides to pass to manual mode.

According to an embodiment, the control valve 60 is actuated by the control unit of the system 52 by means of the second hydraulic circuit 36.

According to an embodiment, the control valve 60 provided with elastic pre-loading means 72 that push the control valve 60 to work in the second operating or safety condition.

In other words, in the absence of hydraulic actuation of the control valve 60 to operate in the first operating condition (standard condition), the system, thanks to the action of the elastic pre-loading means 72, automatically brings it to work in the second, safety, operating condition.

For example, a control branch 76 of said second hydraulic circuit 36 is fluidically connected to the control valve 60 via the interposition of an actuation valve 80. The actuation valve 80 provides a first operating condition in which it fluidically connects the control branch 76 with the control valve 60: this fluid connection allows overcoming the action of the elastic pre-loading means 72 in such a way that also the control valve 60 can work in the first operating condition. The actuation valve 80 also provides a second operating condition in which it fluidically disconnects the control branch 76 from the control valve 60: this fluid disconnection makes prevail the action of the elastic pre-loading means 72 in such a way that also the control valve 60 can work in the second operating condition.

The control valve 60 may, for example, comprise a piston 84 subjected, on the one hand, to the thrust action of the elastic pre-loading means 72 and, the other, to the thrust action of the fluid coming from the control branch 76.

Usually, i.e., in the first operating condition, the hydraulic thrust action coming from the control branch 76 prevails over the elastic thrust of the elastic pre-loading means 72; while, in the second operating condition, the thrust action of the elastic pre-loading means 72 prevails.

The system also comprises a servo-valve 88 that receives the fluid coming from the power generation unit 32. This servo-valve 88 is able to adjust the pressure to be sent to the actuated brake pump 48. It is, therefore, possible to reduce the pressure of the second hydraulic circuit P2 to different values in order to adjust the operation of the actuated brake pump 48.

It should be noted that the correct operation of the servo-valve 88 requires that it operate with highly-filtered fluid absolutely free of impurities. This hydraulic fluid of the second hydraulic circuit 36 has this high degree of filtration while the hydraulic fluid of the first hydraulic circuit 16, which acts on the braking devices 12, cannot provide this degree of filtration. It is therefore important, for the purposes of this invention, that the fluids of the first and second hydraulic circuit 16,36 are always separated from each other and that these hydraulic circuits 16,36 are fluidically separated from each other. In this way, each hydraulic fluid can work optimally within its circuit in order to fulfil its technical function.

According to a possible embodiment, the actuated brake pump 48 is operatively connected, in output 64, to at least two braking devices 12 arranged on the same axle of a vehicle (in case of a 4-wheel vehicle) or to a single braking device (in the case of a 2-wheel vehicle).

According to a possible embodiment it is possible to provide for the mounting on the vehicle of two actuation units so as to independently control braking on different axles, without the need to use a splitter.

As can be appreciated from the description, the brake system for vehicles according to the invention allows overcoming the drawbacks presented in the prior art.

In particular, the brake system for vehicles according to this invention allows solving the technical contradiction of the systems of the prior art, which consists in the fact that, to obtain the required performance, the components are too massive while, with acceptable masses, the components are unable to provide the required actuation powers.

Thanks to this invention, it is instead possible to dimension the electrical components to the average power, and not to power peaks and, therefore, these electrical components will have a lighter weight compatible with use on racing cars.

In fact, the energy introduced in the actuator is gradually accumulated in the form of pressure energy of a fluid and from this "tank" the high power peaks are derived that are required in fast actuations.

The proposed solution also allows exploiting the advantage of a hydraulic application even on vehicles not equipped with a high-pressure hydraulic system: in fact, for such vehicles it is possible to use a specific electro-hydraulic unit able to pressurize a fluid pressure suitable to operate the actuators of the braking devices.

The braking system according to this invention ensures safe conditions; in fact, if the pressure in the second hydraulic circuit falls below a threshold value, the system automatically passes to the second, safety, operating condition that provides direct manual control of the braking devices by the user, through the actuation of the manual actuator.

Under standard conditions, i.e., in the first operating condition, the system provides "BBW" or "brake-by-wire" operation in such a way as to obtain fast, powerful and reliable braking that always meets the request for braking torque that the user makes by operating the manual actuator.

Obviously, the system according to this invention can be easily and advantageously supplemented with additional operating functions such as, for example, the automatic management of braking to avoid locking phenomena (ABS).

A person skilled in the art, in order to satisfy contingent and specific needs, may make numerous modifications and variations to the braking systems described above, all however contained within the scope of the invention as defined by the following claims.

The invention claimed is:

1. A braking system for vehicles comprising
   a hydraulic actuator unit operatively connected to at least one braking device, so as to control actuation of the at least one braking device by a first hydraulic circuit at a first working pressure, wherein the hydraulic actuator unit comprises at least one manual actuator for a user, to allow the user to supply the braking system with a braking request,
   a power generation unit operatively connected to the hydraulic actuator unit by a second hydraulic circuit at a second working pressure,
   an actuated brake pump operatively connected, in input, to the second hydraulic circuit of the power generation unit to be actuated, and operatively connected, in output, to the first hydraulic circuit for actuation of the at least one braking device,
   wherein the first hydraulic circuit and the second hydraulic circuit are supplied with different hydraulic fluids fluidically separate from each other,
   at least one control unit of the system supervises operation of the braking system,
   wherein said control valve is operable in a second operating condition or safety condition, in which the control valve fluidically disconnects the outlet of the actuated brake pump from the at least one braking device and fluidically connects the outlet branch of the manual actuator to the at least one braking device.

2. Braking system for vehicles according to claim 1, wherein the system comprises a control valve interacting with the manual actuator and with the output of the actuated brake pump, said control valve being operable in at least a first operating condition or standard condition, in which the control valve fluidically connects an outlet of the actuated brake pump with the at least one braking device and fluidically disconnects an outlet branch of the manual actuator from the at least one braking device.

3. Braking system for vehicles according to claim 1, wherein the hydraulic actuator unit comprises a hydraulic tank or accumulator that, in the first operating condition, receives and stores the fluid received from an outlet branch of the manual actuator.

4. Braking system for vehicles according to claim 3, wherein the control valve, in the first operating condition, fluidically connects said hydraulic accumulator or tank to the outlet branch of the manual actuator.

5. Braking system for vehicles according to claim 1, wherein the control unit of the system is programmed to actuate the control valve in the first operating condition if the second working pressure in the second hydraulic circuit is kept above or equal to a threshold pressure value and to generate the pressure value required for braking.

6. A braking system for vehicles comprising:
   a hydraulic actuator unit operatively connected to at least one braking device, so as to control actuation of the at least one braking device by a first hydraulic circuit at a first working pressure, wherein the hydraulic actuator unit comprises at least one manual actuator for a user, to allow the user to supply the braking system with a braking request;
   a power generation unit operatively connected to the hydraulic actuator unit by a second hydraulic circuit at a second working pressure;
   an actuated brake pump operatively connected, in input, to the second hydraulic circuit of the power generation unit to be actuated, and operatively connected, in output, to the first hydraulic circuit for actuation of the at least one braking device;
   wherein the first hydraulic circuit and the second hydraulic circuit are supplied with different hydraulic fluids fluidically separate from each other;
   at least one control unit of the system supervises operation of the braking system;
   wherein the hydraulic actuator unit comprises a hydraulic tank or accumulator that, in the second operating condition, receives and stores the fluid received from an outlet of the actuated brake pump.

7. Braking system for vehicles according to claim 6, wherein the control valve, in the second operating condition, fluidically connects said hydraulic accumulator or tank to the outlet of the actuated brake pump.

8. Braking system for vehicles according to claim 1, wherein the control unit of the system is programmed to actuate the control valve in the second operating condition if the pressure in the second hydraulic circuit falls below a threshold value.

9. A braking system for vehicles comprising:
   a hydraulic actuator unit operatively connected to at least one braking device, so as to control actuation of the at least one braking device by a first hydraulic circuit at a first working pressure, wherein the hydraulic actuator unit comprises at least one manual actuator for a user, to allow the user to supply the braking system with a braking request;
   a power generation unit operatively connected to the hydraulic actuator unit by a second hydraulic circuit at a second working pressure;
   an actuated brake pump operatively connected, in input, to the second hydraulic circuit of the power generation unit to be actuated, and operatively connected, in output, to the first hydraulic circuit for actuation of the at least one braking device;
   wherein the first hydraulic circuit and the second hydraulic circuit are supplied with different hydraulic fluids fluidically separate from each other;
   at least one control unit of the system supervises operation of the braking system;
   wherein the control valve is actuated by the control unit of the system by the second hydraulic circuit.

10. Braking system for vehicles according to claim 1, wherein the control valve is provided with an elastic preloader to push the control valve to function in the second operating or safety condition.

11. Braking system for vehicles according to claim 1, wherein the actuated brake pump comprises a dual effect actuating cylinder, subjected at opposite chambers to action of different pressures regulated by a servo-valve acting in the second hydraulic circuit.

12. Braking system for vehicles according to claim 1, wherein the power generation unit comprises an auxiliary circuit of the vehicle for control of auxiliary devices of the vehicle.

13. Method of actuating and controlling a braking system for vehicles, comprising the step of providing a braking system for vehicles according to claim 1.

* * * * *